E. R. SEWARD.
PUMP.
APPLICATION FILED APR. 14, 1911.
1,018,379.
Patented Feb. 20, 1912.
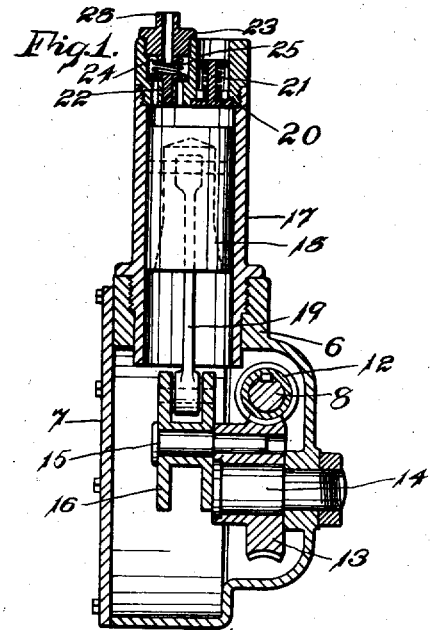
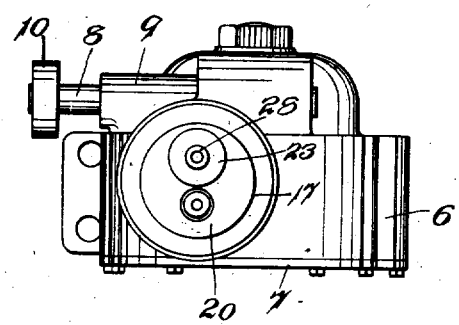
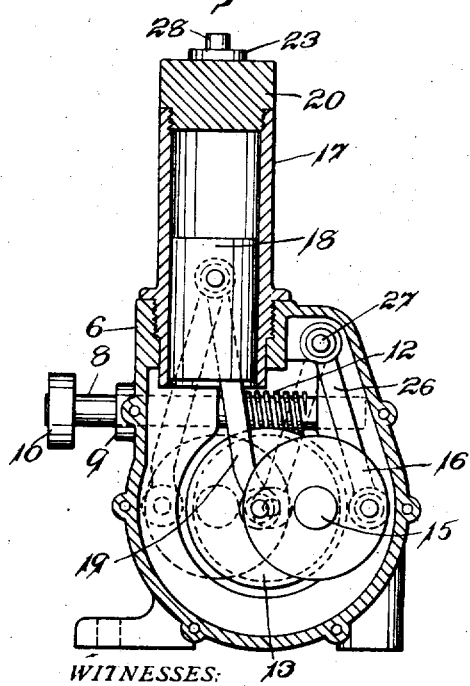
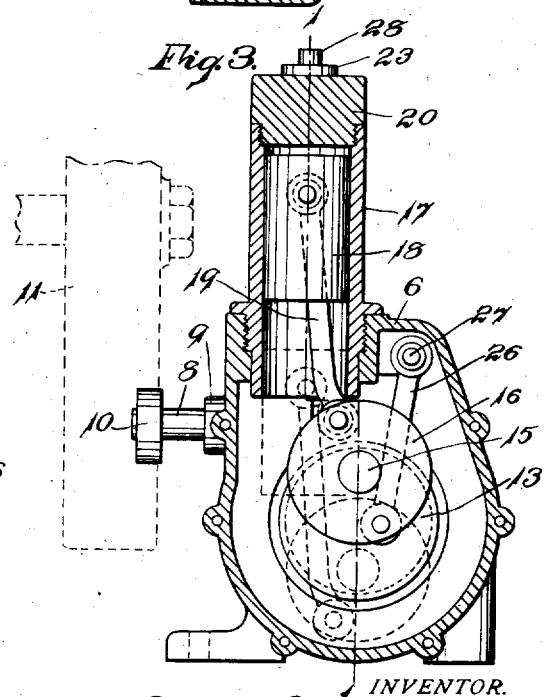
WITNESSES:
Louis Arcia
M. A. Shuckerow
INVENTOR.
Ernest R Seward
BY
Arthur B Jenkins
ATTORNEY.

UNITED STATES PATENT OFFICE.

ERNEST R. SEWARD, OF HARTFORD, CONNECTICUT, ASSIGNOR TO THE HARTFORD MACHINE SCREW COMPANY, OF HARTFORD, CONNECTICUT, A CORPORATION OF CONNECTICUT.

PUMP.

1,018,379.  Specification of Letters Patent.  Patented Feb. 20, 1912.

Application filed April 14, 1911. Serial No. 621,019.

*To all whom it may concern:*

Be it known that I, ERNEST R. SEWARD, a citizen of the United States, and a resident of Hartford, in the county of Hartford and State of Connecticut, have invented a new and Improved Pump, of which the following is a specification.

My invention relates to that class of pumps embodying a reciprocating, sliding piston operated from a rotary member, and an object of my invention, among others, is to provide such a pump so constructed that it will require a very limited space for its operation, and which is therefore especially applicable for attachment to an automobile for the purpose of inflating tires.

Another object of my invention is the production of a pump in which the power exerted upon the piston is in proportion to the amount required for its operation.

Other objects are contemplated by me and these will appear from the following description taken in connection with the accompanying drawings illustrating one form of embodiment of my invention, and in which—

Figure 1 is a view in longitudinal section through a pump embodying my invention, on plane denoted by dotted line 1—1 of Fig. 3, the piston rod being shown in full. Fig. 2 is a like view taken on a plane at right angles to the plane of view of Fig. 1, and showing in full lines the parts in one position of extreme lateral movement, and in dotted lines these parts in the opposite position of extreme lateral movement. Fig. 3 is a view similar to Fig. 2 showing in full lines the parts in one position of extreme longitudinal movement, and in dotted lines the parts in the opposite position of extreme longitudinal movement. Fig. 4 is a top view of the device.

My improved pump is especially applicable for use as a part of the mechanism of an automobile in which the space is very limited, the pump being used for the purpose of inflating tires. For this reason I have adopted this form of a pump for the purpose of illustration in connection with this application although it will be understood that the invention is not necessarily limited to this form of a pump, nor in fact to a pump, as it may find ready application in other forms of mechanism.

In the accompanying drawings the numeral 6 denotes a case of any desired material and preferably closed at one side as by means of a closing plate 7. A main shaft 8 is supported in bearings 9 on the case, this shaft bearing a driving wheel 10 which may be of any suitable form and construction to receive a belt or to be applied for frictional contact as to the fly wheel 11 of an automobile engine, a portion only of such fly wheel being shown herein, as the application will be readily understood. The main shaft bears a worm 12 in mesh with a worm gear 13 mounted on a stud 14 secured to the frame in any suitable manner. This worm gear bears a wrist pin 15 eccentrically mounted thereon, and on this pin a rocking lever 16 (in the form of a disk), is pivotally mounted. One end of a rocking anchoring bar 26 is pivotally secured to said lever on one side of its pivot, the opposite end of the bar being pivotally secured to an anchoring pin 27, and a piston rod 19 is pivoted at one end to said lever on the opposite side of its pivot.

A cylinder 17 is secured to the case and a piston 18 is located in this cylinder, the piston rod 19 connecting the piston with the rocking lever 16. In the preferred form of construction the cylinder is removably secured to the case as is plainly shown in the sectional views of the drawings, and the piston may be of any suitable form and construction for the purpose in hand, in the form herein shown it being tubular and the piston rod being pivotally secured thereto within the opening therein.

A removable head 20 closes one end of the cylinder, this head being in fact a valve head containing an inlet valve 21 and an outlet valve 22. These valves may be of any ordinary form and construction, preferably spring pressed to their seats, the inlet valve being drawn inward as the piston moves away from this end of the cylinder and the outlet valve being forced outward as the piston approaches this end of the cylinder. A plug 23 is secured within the outlet opening 24, this plug having a projection 25 to receive the valve spring and also to afford a stop for said valve. A nipple 28 is suitably formed for the attachment of a piece of tubing by means of which the air is conveyed to the proper place for use.

It will be seen from this construction that a maximum amount of movement of the piston is obtained with a minimum amount of lateral movement of the piston rod, and that the inclosing case, including the cylinder, which must be of a size to permit such movement, may be reduced to minimum dimensions. That is, if an ordinary crank were employed to obtain the same amount of movement of the piston, either the crank case would have to be enlarged lengthwise to provide for the extreme lateral movement, or the cylinder and upper part of the crank case would have to be enlarged in diameter to provide for such extreme movement. A further advantage of the construction resides in the fact that the greatest power is applied to the piston at the time of compression when such power is especially required. That is, the piston rod 19 and the lever or disk 16 act as a toggle, one member of which is the lever 16 and the other the piston rod 19, the lever being pivotally secured at one end to the bar 26 and at its opposite end to the other member 19 of the toggle, the latter being pivotally secured at its opposite end to the piston. The power is applied to these levers at the pivot 15 and it will be noted that in the application of this power the toggle levers are nearly straightened at the time of greatest compression of the piston, or in other words the power constantly increases to this point.

The pump may be driven in any suitable manner, as by swinging it upon its base, which may be constructed for this purpose to bring the driving wheel 10 into contact with the fly wheel of the engine, and the worm and worm gear connection between the driving shaft and rocking lever together with the parallel relation of said shaft and lever avoids vibration of the case and imparts to the piston a steady, even movement.

While I have shown and described herein one form of mechanism for carrying out my invention, this construction may be departed from to a greater or lesser extent and yet be within the spirit and intent of the invention, and I do not therefore limit myself to the exact construction herein shown and described.

I claim—

1. In combination a driving member with means for rotating it, a lever mounted eccentrically on said driving member on a pivot fixed with respect to said lever, a reciprocating member, a rod connecting said lever and reciprocating member from one side of the pivot, and means connected with the lever on the opposite side of the pivot for controlling the movement of said lever.

2. In combination a driving member, means for rotating it, a lever mounted eccentrically on said driving member on a pivot fixed with respect to said lever, a reciprocating member, a connecting rod pivotally secured to said lever and to said reciprocating member, and means pivotally connected with the opposite end of said lever to restrain and thereby control its movement.

3. In combination a driving member with means for rotating it, a lever mounted eccentrically on said driving member on a pivot fixed with respect to said lever, a reciprocating member, a connecting rod pivotally attached to said lever on one side of its pivot and secured to said reciprocating member, and means pivotally connected with said lever on the opposite side of said pivot to restrain and thereby control its movement.

4. In combination a driving member with means for rotating it, a lever mounted eccentrically on said driving member on a pivot fixed with respect to said lever, a reciprocating member, a rod connecting said lever and reciprocating member from one side of the pivot of the lever, and means pivotally connected with said lever at the opposite side of said pivot and with a stationary part to restrain and thereby control the movement of said lever.

5. In combination a worm wheel, a worm in mesh with said wheel, means for driving said worm, a lever mounted eccentrically on said worm wheel on a pivot fixed with respect to said lever, a reciprocating member, a rod connecting said lever and reciprocating member from one side of the pivot of the lever, and means connected to the lever on the opposite side of said pivot for controlling the movement of said lever.

6. In combination a case, a driving member located within said case, means for driving said member, a lever mounted eccentrically on said driving member on a pivot fixed with respect to said lever, a reciprocating member, a connecting rod extending within the case and connecting said lever and reciprocating member from one side of the pivot of the lever, and means located within the case and connected with said lever on the opposite side of said pivot for controlling the movement of said lever.

7. In combination a driving member, means for rotating said member, a lever mounted at its center eccentrically on said driving member on a pivot fixed with respect to said lever, a piston, a piston rod connected with one end of the lever and with said piston, and a controlling member pivotally secured and pivotally connected with said lever at the opposite side of said pivot.

8. In combination a case having a cylinder rising therefrom at one side of its lateral center, a piston located in said cylinder, a driving member located in the case, a lever pivotally mounted on said driving member, a pivotal connection between said lever and piston, and a pivotal connection between a controlling member and said lever.

9. In combination a case having a cylinder projecting therefrom at one side of its lateral center, a driving member located within the case, a lever pivotally mounted on the driving member, a piston located within the cylinder, a piston rod connected with the piston and with said lever on one side of its pivot, and a controlling member pivotally secured within the case and pivotally connected with said lever on the opposite side of its pivot.

10. In combination a case having a cylinder projecting from one end, a piston located within the cylinder, a shaft extending within the case and with a worm thereon, a worm wheel in engagement with said worm, a lever pivotally mounted upon the worm wheel, a piston rod connecting the piston and lever, and a controlling bar pivotally mounted within the case and connected with the opposite end of said lever.

11. In combination, a driving member with means for rotating it, a lever mounted eccentrically on said driving member on a pivot fixed with respect to said lever, a reciprocating member, a rod connecting said lever and reciprocating member at one side of said pivot, and an anchoring device movably mounted and pivotally secured to said lever on the opposite side of said pivot.

ERNEST R. SEWARD.

Witnesses:
ARTHUR B. JENKINS,
E. L. STOUGHTON.

---

Copies of this patent may be obtained for five cents each, by addressing the "Commissioner of Patents, Washington, D. C."